United States Patent
Takemoto et al.

(10) Patent No.: US 11,085,361 B2
(45) Date of Patent: Aug. 10, 2021

(54) PRECOMBUSTION CHAMBER GAS ENGINE

(71) Applicant: MITSUBISHI HEAVY INDUSTRIES ENGINE & TURBOCHARGER, LTD., Sagamihara (JP)

(72) Inventors: Daisuke Takemoto, Tokyo (JP); Akihiro Yuuki, Tokyo (JP); Shunya Sasaki, Tokyo (JP); Kazuo Ogura, Sagamihara (JP); Yuta Furukawa, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/467,731

(22) PCT Filed: Dec. 1, 2017

(86) PCT No.: PCT/JP2017/043319
§ 371 (c)(1),
(2) Date: Jun. 7, 2019

(87) PCT Pub. No.: WO2018/110326
PCT Pub. Date: Jun. 21, 2018

(65) Prior Publication Data
US 2019/0368410 A1    Dec. 5, 2019

(30) Foreign Application Priority Data
Dec. 12, 2016    (JP) .............................. JP2016-240178

(51) Int. Cl.
*F02B 19/18* (2006.01)
*F02B 19/10* (2006.01)
*F02B 19/12* (2006.01)

(52) U.S. Cl.
CPC ............ *F02B 19/18* (2013.01); *F02B 19/108* (2013.01); *F02B 19/12* (2013.01)

(58) Field of Classification Search
CPC .... F02B 19/10; F02B 19/1014; F02B 19/108; F02B 19/12; F02B 19/14; F02B 19/16; F02B 19/18; F02B 23/101; Y02T 10/125
See application file for complete search history.

(56) References Cited

U.S. PATENT DOCUMENTS 8,839,762 B1 *   9/2014   Chiera .................. F02B 19/108
                                                        123/256
9,739,192 B2    8/2017   Willi
(Continued)

FOREIGN PATENT DOCUMENTS

DE    102016005044 A1    11/2016
EP    2 836 690            2/2015
(Continued)

OTHER PUBLICATIONS

JP 05-027240 (Apr. 1993) machine translation.*
(Continued)

*Primary Examiner* — Phutthiwat Wongwian
*Assistant Examiner* — Diem T Tran
(74) *Attorney, Agent, or Firm* — Birch, Stewart, Kolasch & Birch LLP

(57) ABSTRACT

A precombustion chamber gas engine includes a main-chamber forming portion forming a main combustion chamber, a precombustion-chamber forming portion forming a precombustion chamber including a small-diameter cylinder chamber communicating with the main combustion chamber via a plurality of nozzle holes and a large-diameter cylinder chamber, an ignition device disposed in the large-diameter cylinder chamber of the precombustion chamber, and a precombustion-chamber-gas supply device for supplying a
(Continued)

precombustion-chamber fuel gas to the precombustion chamber not via the main combustion chamber. The nozzle hole is formed so that a precombustion-chamber-side straight line passing through a central position of a precombustion-chamber-side opening of the nozzle hole and parallel to an extending direction of a central line of the precombustion-chamber-side opening of the nozzle hole intersects with a main-chamber-side straight line passing through a central position of a main-chamber-side opening of the nozzle hole and parallel to an extending direction of a central line of the main-chamber-side opening of the nozzle hole, and an acute angle between a precombustion chamber central axis of the precombustion chamber and the precombustion-chamber-side straight line is smaller than an acute angle between the precombustion chamber central axis and the main-chamber-side straight line.

6 Claims, 7 Drawing Sheets

(56) References Cited

U.S. PATENT DOCUMENTS

| | | | |
|---|---|---|---|
| 2015/0040845 | A1 | 2/2015 | Chiera et al. |
| 2015/0184578 | A1 | 7/2015 | Oda et al. |
| 2016/0230646 | A1 | 8/2016 | Kim |
| 2016/0326946 | A1* | 11/2016 | Willi ................ F02B 19/08 |

FOREIGN PATENT DOCUMENTS

| | | | |
|---|---|---|---|
| JP | 4-105941 U | | 9/1992 |
| JP | 05-027240 | * | 4/1993 |
| JP | 5-27240 U | | 4/1993 |
| JP | 2012-137083 A | | 7/2012 |
| JP | 2014-62484 A | | 4/2014 |
| JP | 2015-528875 A | | 10/2015 |
| JP | 2016-3606 A | | 1/2016 |
| JP | 2016-33334 A | | 3/2016 |
| WO | WO 2009/114327 A1 | | 9/2009 |
| WO | WO 2014/201030 A1 | | 12/2014 |

OTHER PUBLICATIONS

International Preliminary Report on Patentability and Written Opinion of the International Searching Authority for International Application No. PCT/JP2017/0433119, dated Jun. 27, 2019, with English translation.
International Search Report for International Application No. PCT/JP2017/043319, dated Jan. 9, 2018.
Extended European Search Report, dated Nov. 20, 2019, for European Application No. 17880033.0.
Office Action dated Apr. 14, 2020 issued in the counterpart Japanese Application No. 2016-240178 with an English Translation.
Office Action dated Jun. 17, 2020 issued in counterpart Japanese Application No. 2016-240178 with translation.
Decision of Refusal dated Aug. 18, 2020 issued in counterpart Japanese Appliction No. 2016-240178 with Machine Translation.
Office Action dated Jul. 24, 2020 issued in counterpart EPC Application No. 17880033.0.
Office Action dated Dec. 10, 2020 issued in counterpart Japanese Application No. 2016-240178 with an English Machine.

* cited by examiner

PRECOMBUSTION CHAMBER GAS ENGINE

TECHNICAL FIELD

The present disclosure relates to a precombustion chamber gas engine for combusting an air-fuel mixture in a main combustion chamber (main chamber) by injecting a combustion flame generated in a precombustion chamber (auxiliary chamber) via a plurality of nozzle holes to the main combustion chamber.

BACKGROUND ART

A precombustion chamber gas engine is conventionally known as an engine enabling efficient combustion of a lean premixed gas (for instance, Patent Documents 1 to 3). The precombustion chamber gas engine includes a main combustion chamber (main chamber) defined between a piston and a cylinder head and a precombustion chamber disposed adjacent to the main combustion chamber, for instance above the cylinder. The main combustion chamber communicates with the precombustion chamber via a plurality of nozzle holes. By igniting an air-fuel mixture in the precombustion chamber by an ignition device such as an ignition plug, a combustion flame is generated and jetted via each of the nozzle holes disposed at a lower portion of the precombustion chamber, by which a lean premixed gas in the main combustion chamber is combusted. More specifically, a part of a lean premixed gas introduced into the cylinder during the intake stroke of the engine flows into the precombustion chamber via each of the nozzle holes during the compression stroke and is mixed with a precombustion chamber fuel supplied to the precombustion chamber by a precombustion-chamber-gas supply device to produce an air-fuel mixture having a concentration suitable for ignition in the precombustion chamber. The air-fuel mixture in this state is ignited by the ignition device, and the combustion flame thereof is injected from the precombustion chamber to the cylinder and serves as a torch to ignite and combust the lean premixed gas in the main combustion chamber. This allows combustion of the lean fuel in the main combustion chamber, thus enabling low fuel consumption (high efficiency). Further, since combustion of the lean mixed gas in the main combustion chamber is performed at a relatively low temperature, generation of $NO_x$ is reduced, and low pollution can be achieved.

In such a precombustion chamber gas engine, if the flow of mixed gas from the main chamber to the precombustion chamber via the nozzle holes becomes unstable, an air-fuel mixture having a concentration suitable for ignition is less likely to be formed around an ignition portion of the ignition device (e.g., an electrode of an ignition plug), which may cause unstable combustion in the precombustion chamber. To solve the above problem, on the basis of findings that the shape of the nozzle hole affects the stability of the flow of mixed gas to be introduced into the precombustion chamber, Patent Document 1 defines the shape of a throat (small-diameter cylinder chamber described later) of the precombustion chamber and the shape of a round-chamfered portion along a rim of a throat-side opening end of the nozzle hole to suppress combustion fluctuation.

Further, as described above, since the air-fuel mixture in the main combustion chamber is ignited by the combustion flame (torch jet) injected from the precombustion chamber to the main combustion chamber via each of the nozzle holes at the combustion stroke, variation of propagation of combustion flame of the air-fuel mixture in the main combustion chamber may cause abnormal combustion such as knocking. To solve the above problem, on the basis of findings that the variation of flame propagation speed in the main combustion chamber is caused when the temperature of a cylinder wall surface in an intake region where an intake port is located is lower than the temperature of a cylinder wall surface in an exhaust region where an exhaust port is located, Patent Document 2 discloses that the sum of nozzle hole areas of intake-side nozzle holes disposed in the intake region is made larger than the sum of nozzle hole areas of exhaust-side nozzle holes disposed in the exhaust region. This intends to shorten the time for the flame of an intake-side air-fuel mixture ignited by the torch jet from the intake-side nozzle holes to reach the cylinder wall surface, in order to suppress the occurrence of knocking.

Patent Document 3 discloses an ignition device included in a precombustion chamber gas engine not equipped with the above-described precombustion-chamber-gas supply device. More specifically, it discloses an ignition device capable of injecting an air-fuel mixture combusted as flame to the precombustion chamber from openings of an end cap of the ignition plug by increasing the pressure inside the end cap without fuel enrichment or fuel supply into the igniter or the precombustion chamber. Patent Document 3 discloses a nozzle hole having curvature which communicates with the precombustion chamber via a central passage. This central passage nozzles an incoming cool, fresh air-fuel mixture into a central high-velocity flow. The central high-velocity flow impinges on the end cap and displaces residual combustion gases away from the front of the ignition plug and openings of the end cap to supply the cool, fresh air/fuel mixture into the end cap.

CITATION LIST

Patent Literature

Patent Document 1: JP2016-3608A
Patent Document 2: JP2014-62484A
Patent Document 3: JP2015-528875A (translation of a PCT application)

SUMMARY

Problems to be Solved

In a precombustion chamber gas engine, combustion fluctuation in the main combustion chamber is greatly affected by the mixing state of a precombustion chamber fuel supplied to the precombustion chamber by a precombustion-chamber-gas supply device and a lean premixed gas flowing from the main combustion chamber to the precombustion chamber via nozzle holes during the compression stroke. Since combustion fluctuation in the main combustion chamber affects the efficiency of an engine, it is desired to reduce the combustion fluctuation.

Patent Document 3 described above relates to a precombustion chamber gas engine not equipped with a precombustion-chamber-gas supply device and does not mix a lean premixed gas flowing from the main combustion chamber to the precombustion chamber and a precombustion chamber fuel. Thus, the above-described problem is not raised. Further, the nozzle hole and the central passage are configured to introduce an air-fuel mixture into the end cap.

In view of the above, an object of at least one embodiment of the present invention is to provide a precombustion chamber gas engine capable of sufficiently mixing a lean premixed gas and a precombustion chamber fuel in a precombustion chamber.

Solution to the Problems (1) According to at least one embodiment of the present invention, a precombustion chamber gas engine comprises: a main-chamber forming portion forming a main combustion chamber of an engine; a precombustion-chamber forming portion forming a precombustion chamber including a small-diameter cylinder chamber and a large-diameter cylinder chamber, the small-diameter cylinder chamber communicating with the main combustion chamber via a plurality of nozzle holes and having a predetermined inner diameter, the large-diameter cylinder chamber having an inner diameter larger than that of the small-diameter cylinder chamber; an ignition device disposed in the large-diameter cylinder chamber of the precombustion chamber; and a precombustion-chamber-gas supply device for supplying a precombustion chamber fuel gas to the precombustion chamber not via the main combustion chamber. At least one nozzle hole of the plurality of nozzle holes is formed so that: a precombustion-chamber-side straight line which is a straight line passing through a central position of a precombustion-chamber-side opening of the at least one nozzle hole and parallel to an extending direction of a central line of the precombustion-chamber-side opening of the at least one nozzle hole intersects with a main-chamber-side straight line which is a straight line passing through a central position of a main-chamber-side opening of the at least one nozzle hole and parallel to an extending direction of a central line of the main-chamber-side opening of the at least one nozzle hole; and an acute angle between a precombustion chamber central axis of the precombustion chamber and the precombustion-chamber-side straight line is smaller than an acute angle between the precombustion chamber central axis and the main-chamber-side straight line.

With the above configuration (1), since at least one nozzle hole of the plurality of nozzle holes is formed so that the precombustion-chamber-side straight line intersects with the main-chamber-side straight line, an angle between the central line of the nozzle hole and the precombustion chamber central axis varies between the precombustion chamber side and the main chamber side of the nozzle hole. Further, since the nozzle hole is formed so that an acute angle between the precombustion chamber central axis and the precombustion-chamber-side straight line is smaller than an acute angle between the precombustion chamber central axis and the main-chamber-side straight line, the lean premixed gas is introduced toward a further upper portion of the precombustion chamber from the main combustion chamber via this nozzle hole at the compression stroke. Here, at the time of introducing the lean premixed gas from the precombustion-chamber-side opening to the precombustion chamber, as the inflow direction of the lean premixed gas is directed to an upper portion of the precombustion chamber, mixing of the precombustion chamber fuel gas supplied to the precombustion chamber by the precombustion-chamber-gas supply device and the lean premixed gas incoming from the main combustion chamber is promoted. On the other hand, at the time of injecting the combustion flame ignited in the precombustion chamber to the main combustion chamber via the nozzle hole, as the angle of depression decreases, variation of flame propagation in the main combustion chamber is suppressed, and the combustion fluctuation is suppressed. Thus, with the above configuration, it is possible to promote mixing of fuel in the precombustion chamber at the compression stroke, and it is possible to suppress the combustion fluctuation in the main combustion chamber at the combustion stroke by setting the main-chamber-side angle appropriately for suppressing the variation of flame propagation in the main combustion chamber.

(2) In some embodiments, in the above configuration (1), the at least one nozzle hole of the plurality of nozzle holes includes: a precombustion-chamber-side linear hole portion of linear shape forming the precombustion-chamber-side opening at a first end of the precombustion-chamber-side linear hole portion; and a main-chamber-side linear hole portion of linear shape connected to a second end of the precombustion-chamber-side linear hole portion and forming the main-chamber-side opening.

With the above configuration (2), by forming at least one of the plurality of nozzle holes so as to connect the precombustion-chamber-side linear hole portion and the main-chamber-side linear hole portion each having a linear shape, it is possible to form the nozzle hole in which an acute angle between the precombustion chamber central axis and the precombustion-chamber-side straight line is smaller than an acute angle between the precombustion chamber central axis and the main-chamber-side straight line.

(3) In some embodiments, in the above configuration (1), the at least one nozzle hole of the plurality of nozzle holes includes: a precombustion-chamber-side curved hole portion having a first curvature and forming the precombustion-chamber-side opening at a first end of the precombustion-chamber-side curved hole portion; a main-chamber-side curved hole portion having a second curvature and forming the main-chamber-side opening at a first end of the main-chamber-side curved hole portion; and a connection curved hole portion having a third curvature and connected to a second end of the precombustion-chamber-side curved hole portion and to a second end of the main-chamber-side curved hole portion.

With the above configuration (3), by forming at least one of the plurality of nozzle holes so as to connect the precombustion-chamber-side curved hole portion, the connection curved hole portion, and the main-chamber-side curved hole portion each having an arc shape, it is possible to reduce resistance when the lean premixed gas passes through the nozzle hole at the compression stroke or when the combustion flame passes through the nozzle hole at the combustion stroke. Thus, it is possible to suppress combustion fluctuation in the main combustion chamber at the combustion stroke, while promoting mixing of fuel in the precombustion chamber at the compression stroke, as described above.

(4) In some embodiments, in the above configuration (3), the first curvature, the second curvature, and the third curvature are equal to each other.

With the above configuration (4), since at least one of the plurality of nozzle holes is shaped so as to have a constant curvature, it is possible to reduce resistance when the lean premixed gas passes through the nozzle hole at the compression stroke or when the combustion flame passes through the nozzle hole at the combustion stroke.

(5) In some embodiments, in the above configuration (3), the third curvature is larger than the second curvature, and the first curvature is equal to or larger than the third curvature.

With the above configuration (5), since at least one of the plurality of nozzle holes is shaped so that the curvature is changed, it is possible to reduce resistance when the lean premixed gas passes through the nozzle hole at the compression stroke or when the combustion flame passes through the nozzle hole at the combustion stroke.

(6) In some embodiments, in any one of the above configurations (1) to (5), an acute angle between a central line of the precombustion chamber and the precombustion-chamber-side straight line is 0° or more and 65° or less.

With the above configuration (6), at the time of introducing the lean premixed gas from the precombustion-chamber-side opening to the precombustion chamber, it is possible to sufficiently promote mixing of the precombustion chamber fuel gas supplied to the precombustion chamber by the precombustion-chamber-gas supply device and the lean premixed gas incoming from the main combustion chamber.

(7) In some embodiments, in any one of the above configurations (1) to (6), an acute angle between a main chamber central axis of the main combustion chamber and the main-chamber-side straight line is 65° or more and 80° or less.

With the above configuration (7), at the time of injecting the combustion flame ignited in the precombustion chamber to the main combustion chamber via the nozzle hole, it is possible to sufficiently suppress variation of flame propagation in the main combustion chamber.

(8) In some embodiments, in any one of the above configurations (1) to (7), a length of the small-diameter cylinder chamber is longer than a length of the large-diameter cylinder chamber.

With the above configuration (8), even when the length of the small-diameter cylinder chamber is long, by introducing the lean premixed gas from the main combustion chamber to a further upper portion of the precombustion chamber, it is possible to promote mixing of fuel in the precombustion chamber at the compression stroke.

Advantageous Effects

According to at least one embodiment of the present invention, there is provided a precombustion chamber gas engine capable of sufficiently mixing a lean premixed gas and a precombustion chamber fuel in a precombustion chamber.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
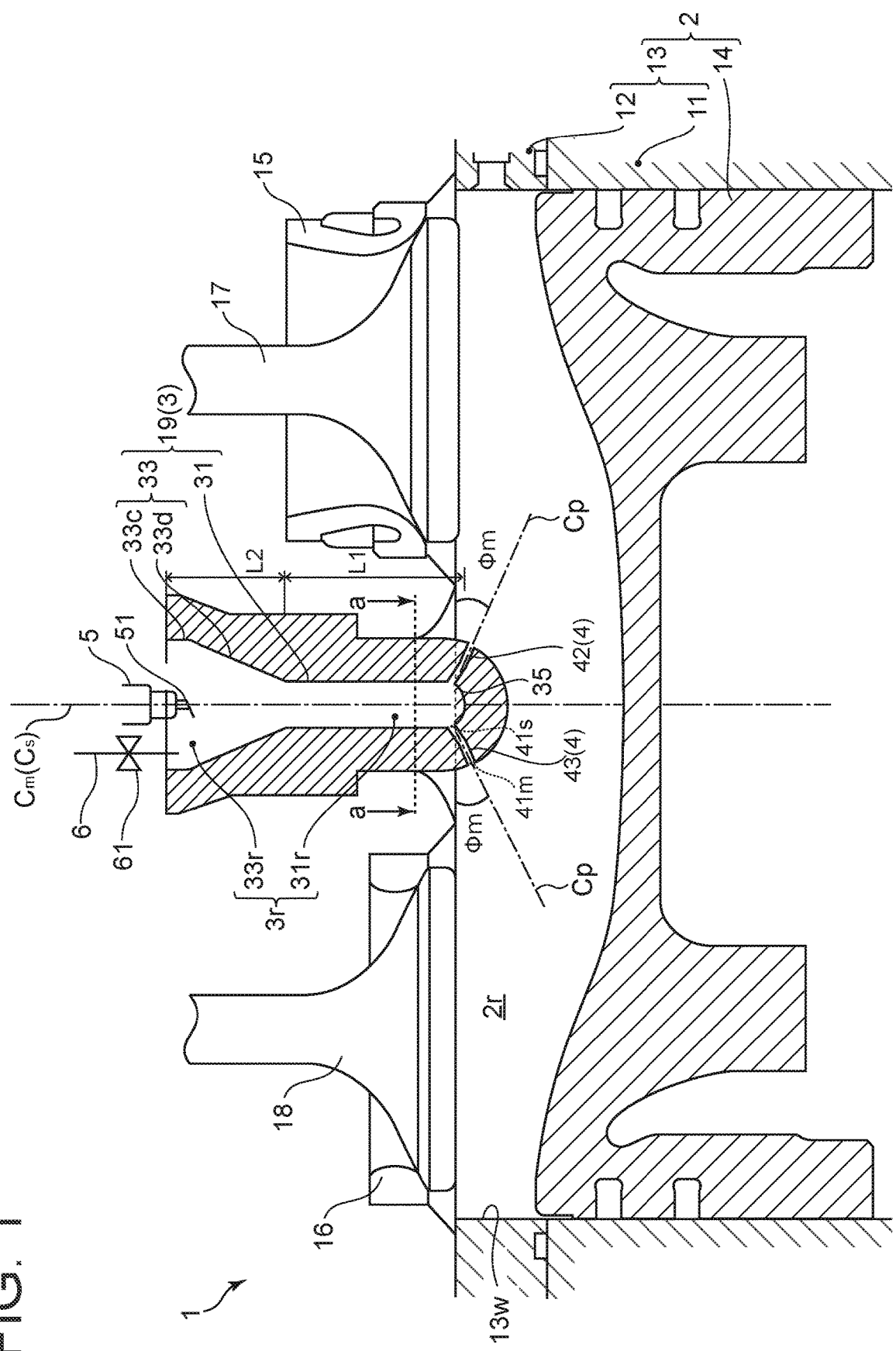
FIG. 1 is a schematic cross-sectional view of a precombustion chamber gas engine according to an embodiment of the present invention. The figure shows a case where the cross-sectional area of a specific near nozzle hole is smaller than the cross-sectional area of a specific far nozzle hole.
Figure 2:
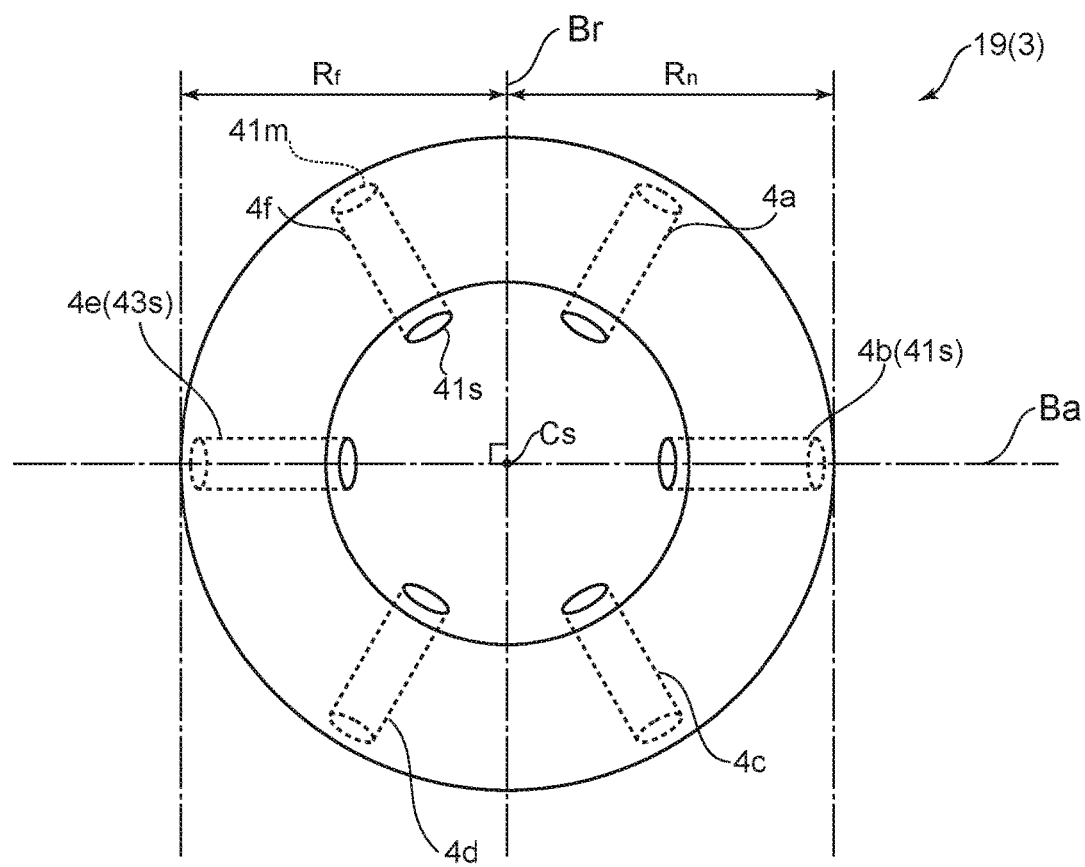
FIG. 2 is a schematic cross-sectional view of a precombustion chamber gas engine taken along line aa in FIG. 1 and shows a cross-section of a precombustion-chamber forming portion according to an embodiment of the present invention.
Figure 3:
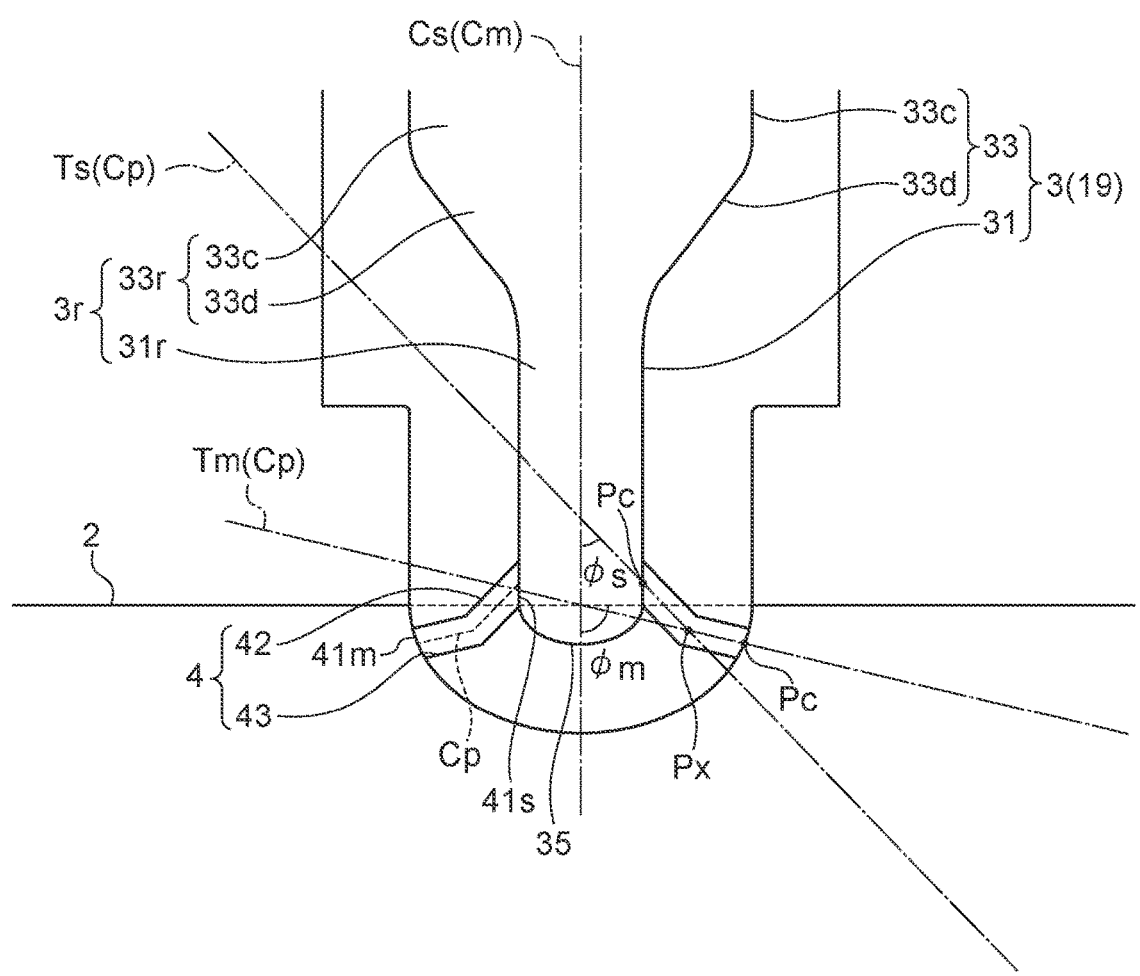
FIG. 3 shows a nozzle hole including a precombustion-chamber-side linear hole portion and a main-chamber-side linear hole portion according to an embodiment of the present invention.
Figure 4:
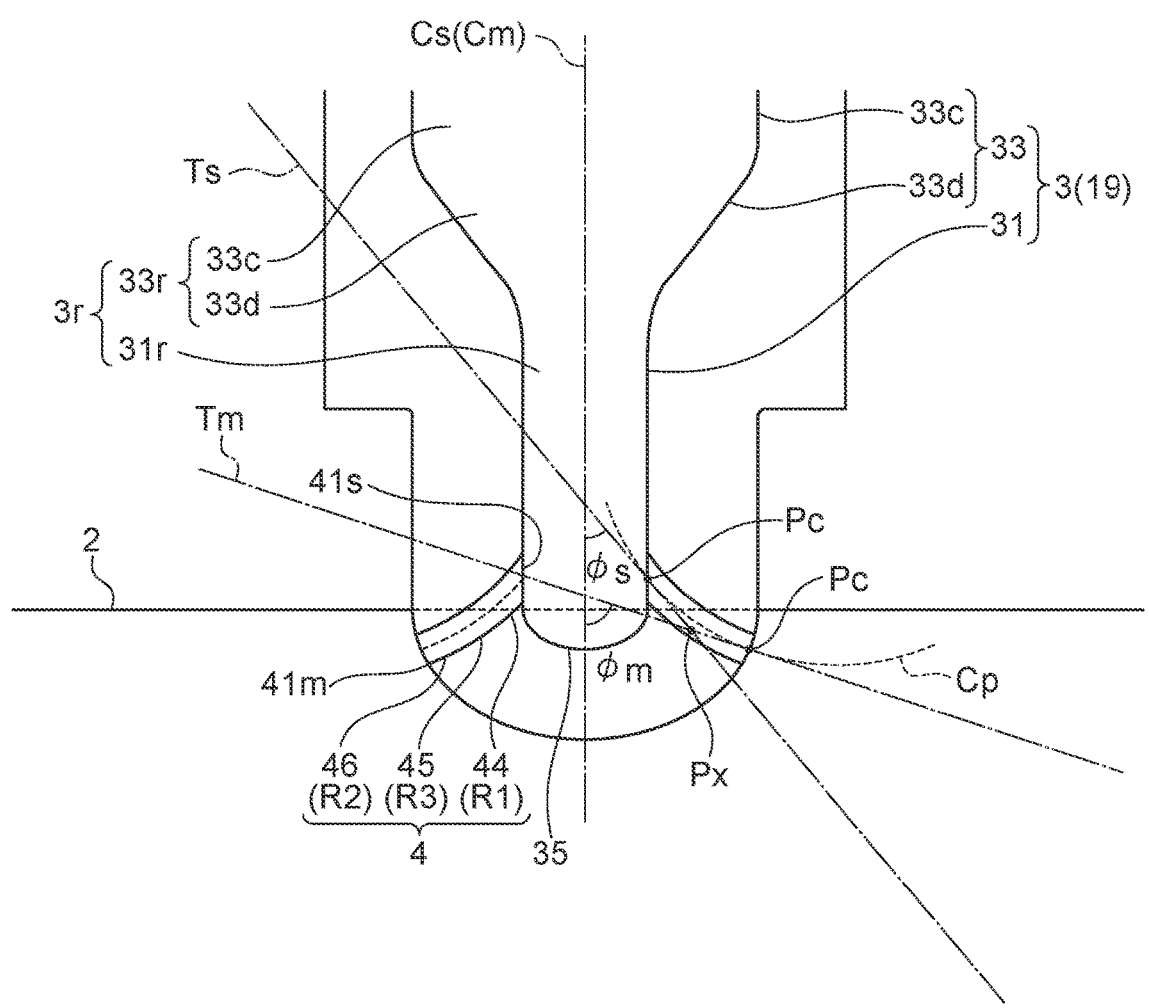
FIG. 4 is a diagram of a nozzle hole including a precombustion-chamber-side curved hole portion, a connection curved hole portion, and a main-chamber-side curved hole portion all having the same curvature according to an embodiment of the present invention.
Figure 5:
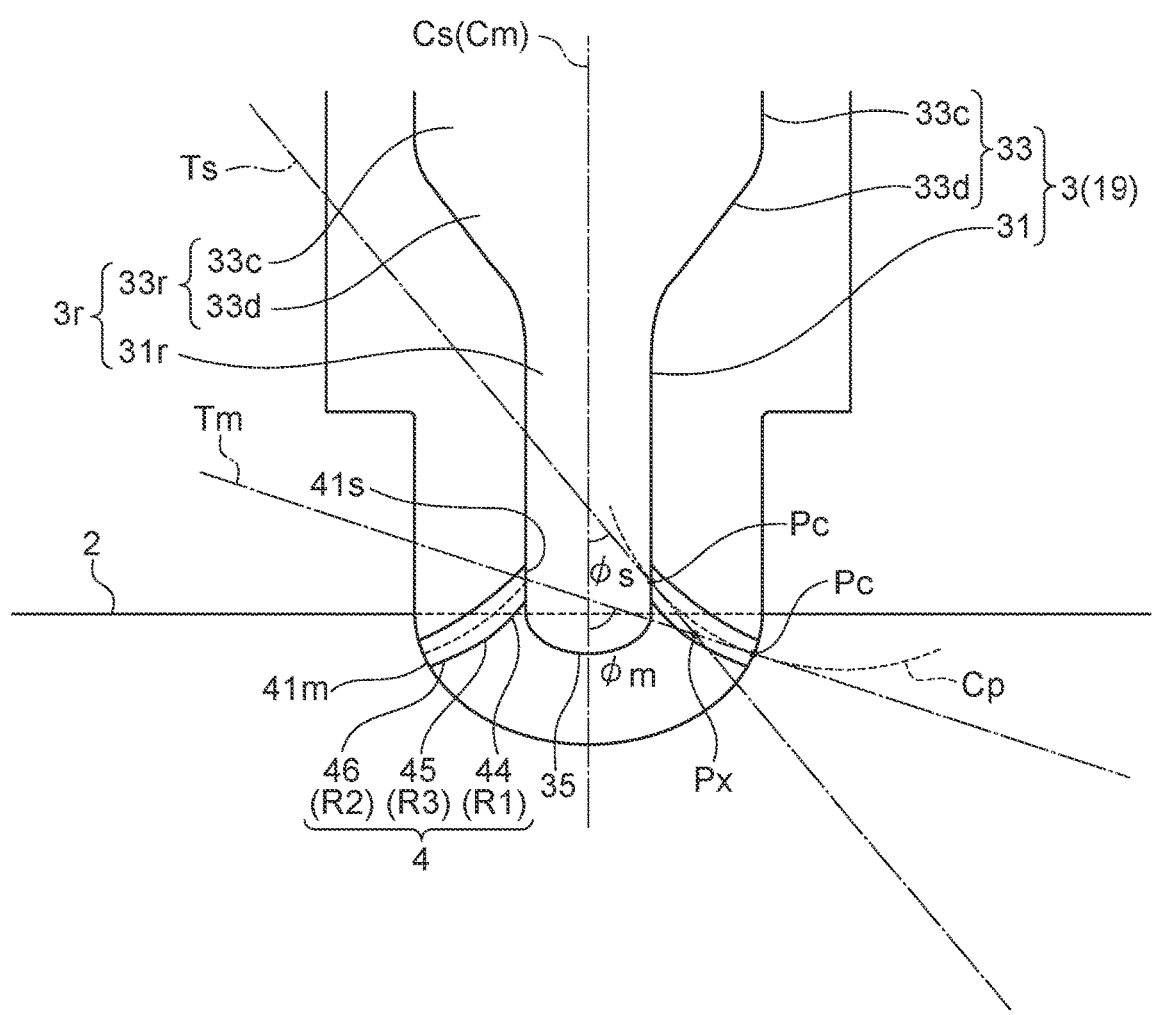
FIG. 5 is a diagram of a nozzle hole including a precombustion-chamber-side curved hole portion, a connection curved hole portion, and a main-chamber-side curved hole portion having different curvatures according to an embodiment of the present invention.
Figure 6A:
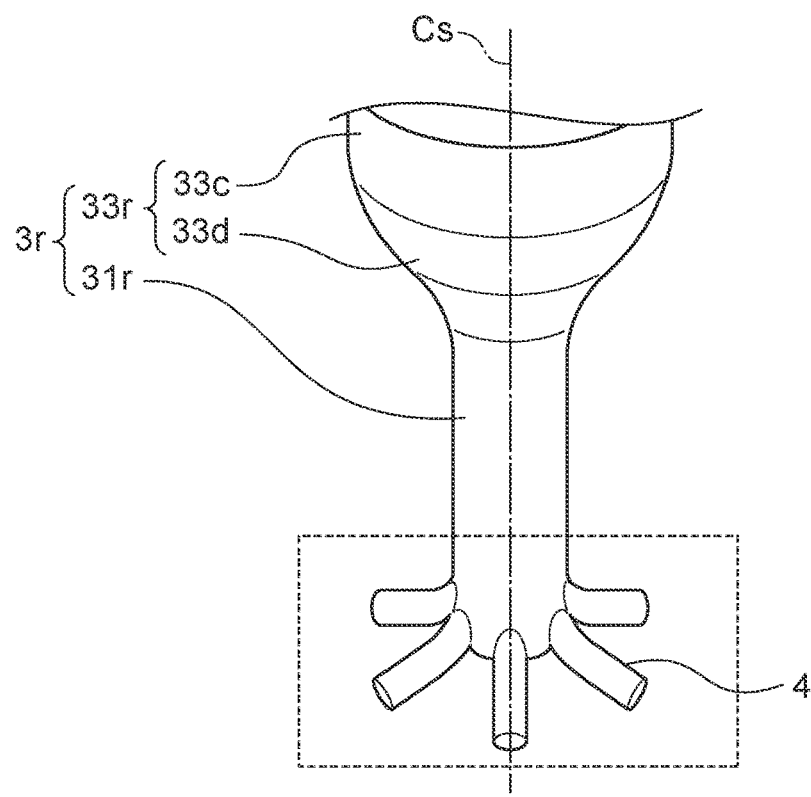
FIG. 6A is a bird's eye view of a precombustion chamber having the nozzle hole shown in FIG. 5.
Figure 6B:
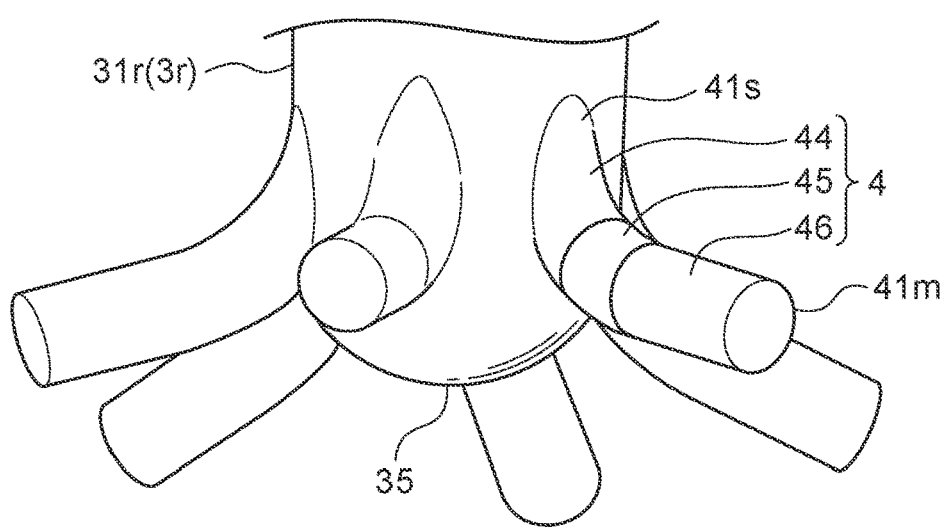
FIG. 6B is an enlarged view of FIG. 6A.
Figure 7:
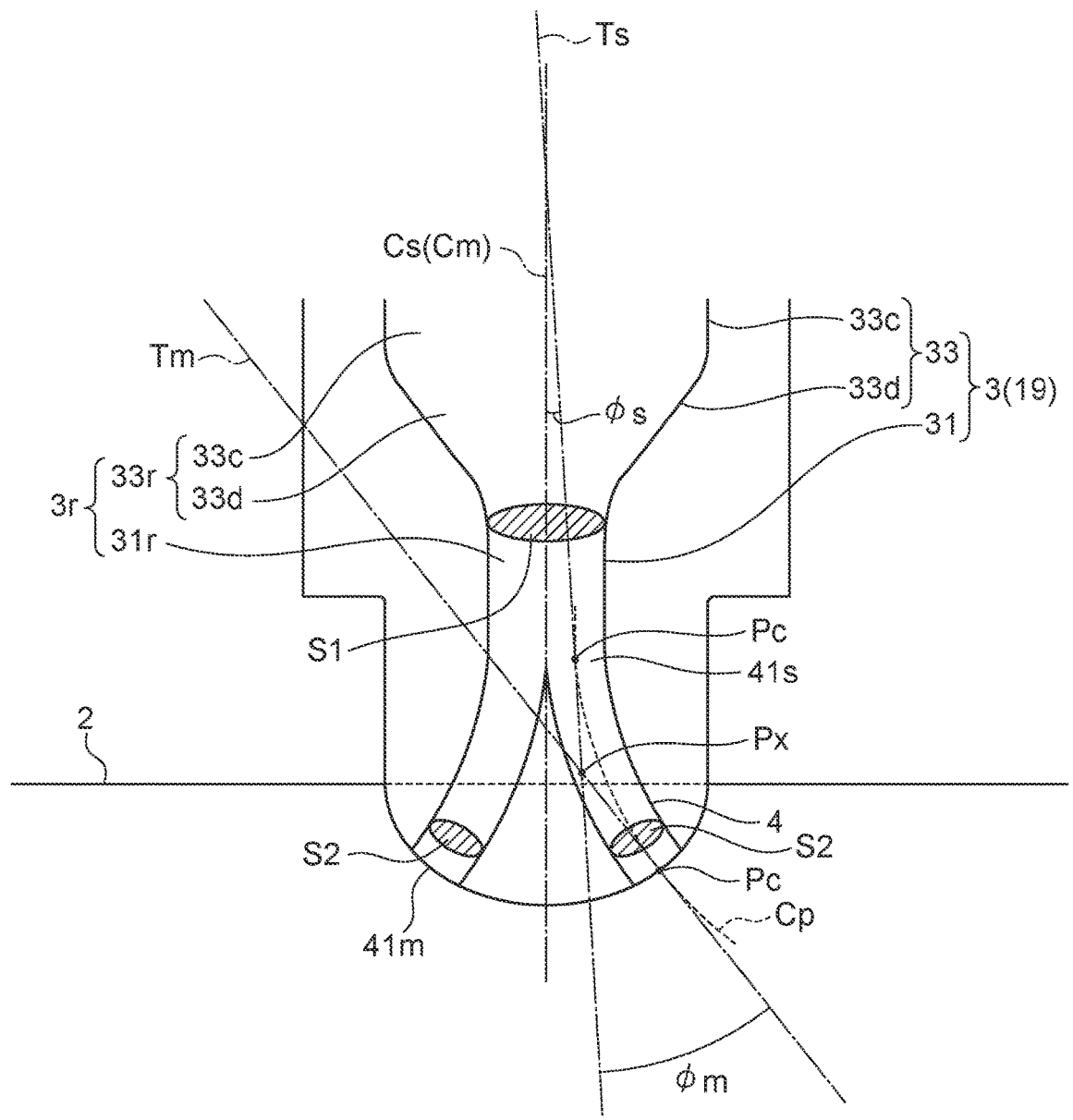
FIG. 7 shows a nozzle hole according to another embodiment of the present invention.

FIG. 1 is a schematic cross-sectional view of a precombustion chamber gas engine 1 according to an embodiment of the present invention. FIG. 2 is a schematic cross-sectional view of a precombustion chamber gas engine 1 taken along line aa in FIG. 1 and shows a cross-section of a precombustion-chamber forming portion 3 according to an embodiment of the present invention. FIG. 3 shows a nozzle hole 4 including a precombustion-chamber-side linear hole portion 42 and a main-chamber-side linear hole portion 43 according to an embodiment of the present invention. FIG. 4 is a diagram of a nozzle hole 4 including a precombustion-chamber-side curved hole portion 44, a connection curved hole portion 45, and a main-chamber-side curved hole portion 46 all having the same curvature R according to an embodiment of the present invention. FIG. 5 is a diagram of a nozzle hole 4 including a precombustion-chamber-side curved hole portion 44, a connection curved hole portion 45, and a main-chamber-side curved hole portion 46 having different curvatures R according to an embodiment of the present invention. FIG. 6A is a bird's eye view of a precombustion chamber 3r having the nozzle hole 4 shown in FIG. 5. FIG. 6B is an enlarged view of FIG. 6A. FIG. 7 shows a nozzle hole 4 according to an embodiment of the present invention.

As shown in FIGS. 1 to 7, the precombustion chamber gas engine 1 includes a main-chamber forming portion 2 forming a main combustion chamber 2r of an engine, a precombustion-chamber forming portion 3 forming a precombustion chamber 3r, an ignition device 5, and a precombustion-chamber-gas supply device 6.

Hereinafter, each of the components of the precombustion chamber gas engine 1 will be described.

As shown in FIG. 1, the precombustion chamber gas engine 1 includes: a cylinder 13 including a cylinder block 11 having therein a cylinder structure of cylindrical shape and a cylinder head 12 having therein a recessed structure capable of capping the top of the cylinder structure; a piston 14 reciprocably disposed in the cylinder 13; an intake port 15 and an exhaust port 16 connected around the cylinder head 12; an intake valve 17 for opening and closing the intake port 15; an exhaust valve 18 for opening and closing the exhaust port 16; and a precombustion chamber cap 19. A main combustion chamber 2r (main chamber) is defined between the cylinder 13 and the piston 14. On the other hand, in the embodiments shown in FIGS. 1 to 7, a precombustion chamber 3r is formed by the precombustion chamber cap 19 disposed on the cylinder head 12 so as to be positioned above the main combustion chamber 2r (opposite to the piston 14). That is, in the embodiments shown in FIGS. 1 to 7, the cylinder 13 and the piston 14 form the main-chamber forming portion 2 and the precombustion chamber cap 19 forms the precombustion-chamber forming portion 3.

As shown in FIGS. 1 to 7, the precombustion-chamber forming portion 3 includes a plurality of nozzle holes 4 connecting the precombustion chamber 3r formed in the precombustion-chamber forming portion 3 to the outside. The main combustion chamber 2r communicates with the precombustion chamber 3r via the plurality of nozzle holes 4. More specifically, each of the nozzle holes 4 has a main-chamber-side opening 41m facing the main combustion chamber 2r on one side and a precombustion-chamber-side opening 41s facing the precombustion chamber 3r on the other side. A precombustion-chamber-side opening end 42s is connected to a bottom portion 35 including a portion furthest from the top portion where an ignition portion 51 is disposed. As shown in FIG. 2, the plurality of nozzle holes 4 may be arranged around the central axis of the precombustion chamber 3r (hereinafter, precombustion chamber central axis Cs) at an equal interval, and each of the nozzle holes 4 may extend linearly, in a plan view. In the example of FIG. 2, the cross-sectional shape (shape in plan view) of the precombustion-chamber forming portion 3 (precombustion chamber cap 19) having the precombustion chamber central axis Cs as a normal is circular, and the precombustion-chamber forming portion 3 has, for instance, six linear nozzle holes 4. The nozzle holes 4 (main-chamber-side openings 41m and precombustion-chamber-side openings 41s) are arranged at an equal interval of 60° around the precombustion chamber central axis Cs and each of the nozzle holes 4 extends along the radial direction. Further, each of the nozzle holes extends at a predetermined angle of depression. The angle of depression of the nozzle hole 4 is an angle between a line perpendicular to the central axis of the main combustion chamber 2r (hereinafter, main chamber central axis Cm) and a main-chamber-side straight line Tm (described later) of the nozzle hole 4 and is represented by the main-chamber-side angle φm in the embodiments shown in FIGS. 1 to 7.

Further, the precombustion-chamber forming portion 3 includes a small-diameter-cylinder forming portion 31 which forms a small-diameter cylinder chamber 31r having a predetermined inner diameter and connected to the plurality of nozzle holes 4 and a large-diameter-cylinder forming portion 33 which forms a large-diameter cylinder chamber 33r having an inner diameter larger than that of the small-diameter cylinder chamber 31r. That is, the precombustion chamber 3r includes a small-diameter cylinder chamber 31r and a large-diameter cylinder chamber 33r. Further, the large-diameter cylinder chamber 33r includes an enlarged diameter cylinder portion 33d connected to the small-diameter cylinder chamber 31r and having an inner diameter increasing with a distance from the small-diameter cylinder chamber 31r and a cylindrical constant diameter cylinder portion 33c connected to the enlarged diameter cylinder portion 33d and having an inner diameter equal to the maximum diameter of the enlarged diameter cylinder portion 33d. Further, the precombustion chamber central axis Cs coincides with the central axis of the small-diameter cylinder chamber 31r. However, the present invention is not limited to the present embodiments. In some embodiments, the precombustion chamber 3r may have other shape, for instance, a cylindrical shape having a constant inner diameter. Further, although in the embodiment shown in FIG. 1, the main chamber central axis Cm coincides with the precombustion chamber central axis Cs, the present invention is not limited thereto. In some embodiments, the main chamber central axis Cm may not coincide with the precombustion chamber central axis Cs, for instance, the precombustion chamber central axis Cs may be oblique to the main chamber central axis Cm. Further, the central axis of the small-diameter cylinder chamber 31r may not coincide with the central axis of the large-diameter cylinder chamber 33r.

The ignition device 5 is disposed in the large-diameter cylinder chamber 33r of the precombustion chamber 3r as shown in FIG. 1. More specifically, the ignition device 5 has an ignition portion 51 capable of igniting an air-fuel mixture. In the embodiment shown in FIG. 1, the ignition device 5 is an ignition plug, and the ignition device 5 is disposed on an engine so that an electrode (ignition portion 51) of the ignition plug is positioned on the precombustion chamber central axis Cs. However, the present invention is not limited to the present embodiment. The ignition device 5 may be disposed on an engine so that the ignition portion 51 (e.g., electrode of ignition plug) is spaced from the central axis of the main combustion chamber 2r (hereinafter, main chamber central axis Cm) at a predetermined distance.

The precombustion-chamber-gas supply device 6 directly supplies a precombustion chamber fuel gas to the precombustion chamber 3r not via the main combustion chamber 2r. In the embodiment shown in FIG. 1, the precombustion-chamber-gas supply device 6 is configured to supply a precombustion chamber fuel gas to the large-diameter cylinder chamber 33r, and the supply of the precombustion chamber fuel gas to the precombustion chamber 3r is controlled by a precombustion-chamber-fuel-gas supply valve 61 (see FIG. 1).

The precombustion chamber gas engine 1 having the above configuration opens the intake valve 17 and closes the exhaust valve 18 when the piston 14 moves downward at the intake stroke, for instance. As the intake valve 17 opens, a lean premixed gas containing a mixture of a fuel gas and air is introduced into the cylinder 13 through the intake port 15 connected to the intake valve 17. As the precombustion-chamber-fuel-gas supply valve 61 opens, a precombustion chamber fuel gas is introduced into the precombustion chamber 3r. Furthermore, at the compression stroke, the precombustion-chamber-fuel-gas supply valve 61 closes when the piston 14 moves upward. Further, the lean premixed gas introduced into the cylinder 13 through the intake port 15 is compressed as the piston 14 moves upward, and a part of the lean premixed gas is introduced into the precombustion chamber 3r through each of the nozzle holes 4 of the precombustion chamber 3r. The lean premixed gas introduced from the main combustion chamber 2r to the precombustion chamber 3r is mixed with the precombustion chamber fuel gas to produce an air-fuel mixture having a concentration suitable for ignition in the precombustion chamber 3r. The air-fuel mixture in the precombustion chamber 3r is ignited by the ignition device 5 at a predetermined timing when the piston 14 arrives at the vicinity of the compression top dead center, and the air-fuel mixture in the precombustion chamber 3r is thus combusted. A combustion flame caused by this combustion is injected into the cylinder 13 through each of the nozzle holes and ignites the lean premixed gas in the cylinder 13, which leads to combustion of the lean premixed gas in the main combustion chamber 2r.

In this regard, in the precombustion chamber gas engine 1, combustion fluctuation in the main combustion chamber 2r is greatly affected by the mixing state of the precombustion chamber fuel gas supplied to the precombustion chamber 3r by the precombustion-chamber-gas supply device 6 and the lean premixed gas flowing from the main combustion chamber 2r to the precombustion chamber 3r via the nozzle holes 4 during the compression stroke. Further, at the time of introducing the lean premixed gas from the precombustion-chamber-side opening 41s to the precombustion chamber 3r, as the inflow direction of the lean premixed gas is directed to an upper portion of the precombustion chamber 3r, mixing of the precombustion chamber fuel gas supplied to the precombustion chamber 3r by the precombustion-chamber-gas supply device 6 and the lean premixed gas incoming from the main combustion chamber 2r is promoted. On the other hand, at the time of injecting the combustion flame ignited in the precombustion chamber 3r to the main combustion chamber 2r via the nozzle hole 4, as the angle of depression decreases, variation of flame propagation in the main combustion chamber 2r is suppressed, and the combustion fluctuation is suppressed. In view of this, the present inventors have arrived at forming the plurality of nozzle holes 4 in a later-described shape to promote mixing of fuel in the precombustion chamber 3r at the compression stroke, to suppress the combustion fluctuation in the main combustion chamber 2r at the combustion stroke, and to reduce residue of non-combusted fuel, thereby attempting to improve the efficiency.

More specifically, as shown in FIGS. 3 to 7, at least one of the plurality of nozzle holes 4 is formed so that a precombustion-chamber-side straight line Ts, which is a straight line passing through the central position Pc of the precombustion-chamber-side opening 41s of the nozzle hole 4 and parallel to the extending direction of the central line Cp of the precombustion-chamber-side opening 41s of the nozzle hole 4, intersects with a main-chamber-side straight line Tm, which is a straight line passing through the central position Pc of the main-chamber-side opening 41m of the nozzle hole 4 and parallel to the extending direction of the central line Cp of the main-chamber-side opening 41m of the nozzle hole 4, and an acute angle (precombustion-chamber-side angle φs) between the precombustion chamber central axis Cs of the precombustion chamber 3r and the precombustion-chamber-side straight line Ts is smaller than an acute angle (main-chamber-side angle φm) between the precombustion chamber central axis Cs and the main-chamber-side straight line Tm (φs<φm).

In brief, the precombustion-chamber-side straight line Ts is a tangential line of the central line Cp of the nozzle hole 4 at the central position Pc of the precombustion-chamber-side opening 41s of the nozzle hole 4, and the main-chamber-side straight line Tm is a tangential line of the central line Cp of the nozzle hole 4 at the central position Pc of the main-chamber-side opening 41m of the nozzle hole 4. Herein, the tangential line includes a line parallel to the central line Cp of the nozzle hole 4. Further, the precombustion-chamber-side straight line Ts and the main-chamber-side straight line Tm intersect at an intersection point Px, and the inclination of the precombustion-chamber-side straight line Ts to the precombustion chamber central axis Cs is larger than the inclination of the main-chamber-side straight line Tm to the precombustion chamber central axis Cs. That is, since the precombustion-chamber-side straight line Ts is directed to a further upper portion of the precombustion chamber 3r than the main-chamber-side straight line Tm is directed, at the time of introducing the lean premixed gas to the precombustion chamber 3r through the nozzle hole 4 thus shaped, the lean premixed gas is introduced toward a further upper portion of the precombustion chamber 3r as compared with a nozzle hole 4 in which the main-chamber-side straight line Tm coincides with the precombustion-chamber-side straight line Ts. As a result, it is possible to promote mixing of the precombustion chamber fuel gas in the precombustion chamber 3r and the lean premixed gas incoming from the main combustion chamber 2r. Further, at this time, by setting the main-chamber-side angle φm appropriately for suppressing the variation of flame propagation in the main combustion chamber 2r, it is possible to suppress the combustion fluctuation in the main combustion chamber 2r.

Although in the embodiments shown in FIGS. 1 to 7, all of the plurality of nozzle holes 4 have the same shape, the present invention is not limited thereto. In some embodiments, as described above, at least one of the nozzle holes 4 is formed so that precombustion-chamber-side angle φs differs from the main-chamber-side angle φm. Further, the nozzle hole 4 in which the precombustion-chamber-side angle φs is smaller than the main-chamber-side angle φm may be formed by electrical discharge machining processing metal with sparks.

With the above configuration, since at least one nozzle hole 4 of the plurality of nozzle holes 4 is formed so that the precombustion-chamber-side straight line Ts intersects with the main-chamber-side straight line Tm, an angle between the central line Cp of the nozzle hole 4 and the precombustion chamber central axis Cs varies between the precombustion chamber side and the main chamber side of the nozzle hole (φ≠φs). Further, since the nozzle hole 4 is formed so that an acute angle (φs) between the precombustion chamber central axis Cs and the precombustion-chamber-side straight line Ts is smaller than an acute angle (φm) between the precombustion chamber central axis Cs and the main-chamber-side straight line Tm, the lean premixed gas is introduced toward a further upper portion of the precombustion chamber 3r from the main combustion chamber 2r via this nozzle hole 4 at the compression stroke. Thus, it is possible to promote mixing of fuel in the precombustion chamber 3r at the compression stroke, and it is possible to suppress the combustion fluctuation in the main combustion chamber at the combustion stroke by setting the main-chamber-side angle φm appropriately for suppressing the variation of flame propagation in the main combustion chamber 2r. Further, by setting the angle appropriately for reducing residue of non-combusted fuel in the main combustion chamber 2r, it is possible to suppress knocking and reduce heat loss.

Next, a specific shape of the nozzle hole 4 will be described with reference to FIGS. 3 to 7.

In some embodiments, as shown in FIG. 3, at least one of the plurality of nozzle holes 4 includes a precombustion-chamber-side linear hole portion 42 and a main-chamber-side linear hole portion 43. The precombustion-chamber-side linear hole portion 42 is a linear portion of the nozzle hole 4 which forms the precombustion-chamber-side opening 41s at a first end of the precombustion-chamber-side linear hole portion 42. The main-chamber-side linear hole portion 43 is a linear portion of the nozzle hole 4 which is connected to a second end of the precombustion-chamber-side linear hole portion 42 and forms the main-chamber-side opening 41m. Since each of the precombustion-chamber-side linear hole portion 42 and the main-chamber-side linear hole portion 43 has a linear shape, the precombustion-chamber-side straight line Ts coincides with the central line Cp of the nozzle hole 4 passing through the precombustion-chamber-side linear hole portion 42, and the main-chamber-side straight line Tm coincides with the central line Cp of the nozzle hole 4 passing through the main-chamber-side linear hole portion 43.

With the above configuration, by forming at least one of the plurality of nozzle holes 4 so as to connect the precombustion-chamber-side linear hole portion 42 and the main-chamber-side linear hole portion 43 each having a linear shape, it is possible to form the nozzle hole 4 in which an acute angle (precombustion-chamber-side angle φs) between the precombustion chamber central axis Cs and the precombustion-chamber-side straight line Ts is smaller than an acute angle (main-chamber-side angle φm) between the precombustion chamber central axis Cs and the main-chamber-side straight line Tm.

In some embodiments, as shown in FIGS. 4 to 7, at least one of the plurality of nozzle holes 4 includes a precombustion-chamber-side curved hole portion 44, a connection curved hole portion 45, and a main-chamber-side curved hole portion 46. The precombustion-chamber-side curved hole portion 44 is a portion of the nozzle hole 4 which has a first curvature R1 and forms the precombustion-chamber-side opening 41s at a first end of the precombustion-chamber-side curved hole portion 44. The main-chamber-side curved hole portion 46 is a portion of the nozzle hole 4 which has a second curvature R2 and forms the main-chamber-side opening 41m at a first end of the main-chamber-side curved hole portion 46. Further, the connection curved hole portion 45 is a portion which has a third curvature R3 and has both ends respectively connected to a second end of the precombustion-chamber-side curved hole portion 44 and a second end of the main-chamber-side curved hole portion 46. The curvature R is the reciprocal of the radius.

For instance, in some embodiments, as shown in FIG. 4, the first curvature R1, the second curvature R2, and the third curvature R3 may be equal to each other (R1=R2=R3). That is, at least one of the plurality of nozzle holes 4 is formed at a constant curvature. In the embodiment shown in FIG. 4, the second curvature R2 of the main-chamber-side curved hole portion 46 and the third curvature R3 of the connection curved hole portion 45 are equal to the first curvature R1 of the precombustion-chamber-side curved hole portion 44.

For instance, in other embodiments, as shown in FIGS. 5 to 7, the third curvature R3 of the connection curved hole portion 45 is larger than the second curvature of the main-chamber-side curved hole portion 46 (R2<R3). Further, the first curvature R1 of the precombustion-chamber-side curved hole portion 44 is equal to the third curvature R3 of the connection curved hole portion 45 or larger than the third curvature R3 (R1=R3 or R1>R3). In the embodiments shown in FIGS. 5 to 6B, the first curvature R1 of the precombustion-chamber-side curved hole portion 44 is larger than the third curvature R3 of the connection curved hole portion 45 (R1>R3). By contrast, in the embodiment shown in FIG. 7, the first curvature R1 of the precombustion-chamber-side curved hole portion 44 is equal to the third curvature R3 of the connection curved hole portion 45 (R1=R3). However, the nozzle hole 4 having the shape as shown in FIGS. 5 to 6B may have the first curvature R1 equal to the third curvature R3, and the nozzle hole 4 having the shape as shown in FIG. 7 may have the first curvature R1 larger than the third curvature R3, of course. In addition, at least one curvature of the first curvature R1, the second curvature R2, or the third curvature R3 may be infinite, for instance, the third curvature R3 may be infinite so that the corresponding curved portion has a linear shape.

With the above configuration, by forming at least one of the plurality of nozzle holes 4 so as to connect the precombustion-chamber-side curved hole portion 44, the connection curved hole portion 45, and the main-chamber-side curved hole portion 46 each having an arc shape, it is possible to reduce resistance when the lean premixed gas passes through the nozzle hole at the compression stroke or when the combustion flame passes through the nozzle hole at the combustion stroke, compared with the nozzle hole 4 including the precombustion-chamber-side linear hole portion 42 and the main-chamber-side linear hole portion 43 described above. Further, with the above configuration, it is possible to form the nozzle hole 4 in which an acute angle (precombustion-chamber-side angle φs) between the precombustion chamber central axis Cs and the precombustion-chamber-side straight line Ts is smaller than an acute angle (main-chamber-side angle φm) between the precombustion chamber central axis Cs and the main-chamber-side straight line Tm.

Further, in the embodiments described above (see FIGS. 3 to 7), in some embodiments, in a case where the precombustion-chamber-side angles φs of all the nozzle holes 4 are the same, the main-chamber-side angle φm of all the nozzle holes 4 may be the same, or the main-chamber-side angle φm of at least one of the nozzle holes 4 may be different from those of the other nozzle holes 4. That is, by setting the main-chamber-side angle φm of each of the nozzle holes 4 appropriately, it is possible to reduce residue of non-combusted fuel in the main combustion chamber 2r, and it is possible suppress knocking and reduce heat loss. Thus, it is possible to improve the efficiency.

Further, in the embodiments described above (see FIGS. 3 to 7), in some embodiments, each of the nozzle holes 4 may be formed so that the precombustion-chamber-side openings 41s of the plurality of nozzle holes 4 are positioned at an equal interval in a plan view while the main-chamber-side openings 41m of the plurality of nozzle holes 4 are positioned at an unequal interval in a plan view. That is, by setting the position of the main-chamber-side opening 41m of each of the nozzle holes 4 appropriately, it is possible to reduce residue of non-combusted fuel in the main combustion chamber 2r, and it is possible suppress knocking and reduce heat loss. Thus, it is possible to improve the efficiency.

Further, in some embodiments, in the embodiments described above (see FIGS. 3 to 7), an acute angle (precombustion-chamber-side angle φs) between the central line Cp of the precombustion chamber 3r and the precombustion-chamber-side straight line Ts may be 0° or more and 65° or less (0°≤φs≤65°). Thereby, at the time of introducing the lean premixed gas from the precombustion-chamber-side opening 41s to the precombustion chamber 3r, it is possible to sufficiently promote mixing of the precombustion chamber fuel gas supplied to the precombustion chamber 3r by the precombustion-chamber-gas supply device 6 and the lean premixed gas incoming from the main combustion chamber 2r. For instance, as shown in FIG. 7, by forming the precombustion-chamber-side opening 41s of the nozzle hole 4 at a position close to the precombustion chamber central axis Cs, the precombustion-chamber-side angle φs can be easily brought close to 0 degrees. Further, in the example in FIG. 7, the sum of the cross-sectional areas S2 of the plurality of nozzle holes 4 can be brought close to the cross-sectional area S1 of the small-diameter cylinder chamber 31r (S1≥ΣS2), and thus it is possible to reduce pressure loss caused when the lean premixed gas or the combustion flame passes through the nozzle hole 4.

Further, in some embodiments, in the embodiments described above (see FIGS. 3 to 7), an acute angle between the main chamber central axis Cm and the main-chamber-side straight line Tm may be 65° or more and 80° or less. As shown in FIG. 1, in a case where the main chamber central axis Cm coincides with the precombustion chamber central axis Cs, the main-chamber-side angle φm is 65° or more and 80° or less (65°≤φm≤80°). Thereby, at the time of injecting the combustion flame ignited in the precombustion chamber 3r to the main combustion chamber 2r via the nozzle hole 4, it is possible to sufficiently suppress variation of flame propagation in the main combustion chamber 2r.

Further, in some embodiments, as shown in FIGS. 1 to 6, the length L1 of the small-diameter cylinder chamber 31r is longer than the length L2 of the large-diameter cylinder chamber 33r (L1>L2) (see FIG. 1). As the length L1 of the small-diameter cylinder chamber 31r increases, the distance from the precombustion-chamber-side opening 41s formed in the vicinity of the bottom portion 35 of the precombustion chamber 3r to the ignition portion 51 increases. This tends to prevent appropriate mixing of the precombustion chamber fuel gas and the lean premixed gas coming from the main combustion chamber 2r. However, in the above-described embodiments, since the lean premixed gas introduced from the main combustion chamber is directed to a further upper portion of the precombustion chamber fuel, it is possible to promote mixing of fuel in the precombustion chamber at the compression stroke even if the length of the small-diameter cylinder chamber 31r increases.

The present invention is not limited to the embodiments described above, but includes modifications to the embodiments described above, and embodiments composed of combinations of those embodiments.

REFERENCE SIGNS LIST

1 Precombustion chamber gas engine
11 Cylinder block
12 Cylinder head
13 Cylinder
14 Piston
15 Intake port
16 Exhaust port
17 Intake valve
18 Exhaust valve
19 Precombustion chamber cap
2 Main-chamber forming portion
2r Main combustion chamber
3 Precombustion-chamber forming portion
3r Precombustion chamber
31 Small-diameter-cylinder forming portion
31r Small-diameter cylinder chamber
33 Large-diameter-cylinder forming portion
33r Large-diameter cylinder chamber
33c Constant diameter cylinder portion
33d Enlarged diameter cylinder portion
35 Bottom portion
4 Nozzle hole
41m Main-chamber-side opening
41s Precombustion-chamber-side opening
42 Precombustion-chamber-side linear hole portion
42s Precombustion-chamber-side opening end
43 Main-chamber-side linear hole portion
44 Precombustion-chamber-side curved hole portion
45 Connection curved hole portion
46 Main-chamber-side curved hole portion
5 Ignition device
51 Ignition portion
6 Precombustion-chamber-gas supply device
61 Precombustion-chamber-fuel-gas supply valve
Cm Main chamber central axis
Cs Precombustion chamber central axis
Cp Central line of nozzle hole
Pc Central position
Tm Main-chamber-side straight line
Ts Precombustion-chamber-side straight line
Px Intersection point between main-chamber-side straight line and precombustion-chamber-side straight line
R curvature
R1 First curvature (Curvature of precombustion-chamber-side curved hole portion)
R2 Second curvature (Curvature of main-chamber-side curved hole portion)
R3 Third curvature (Curvature of connection curved hole portion)
L Length

The invention claimed is:

1. A precombustion chamber gas engine comprising:
a main-chamber forming portion forming a main combustion chamber of an engine;
a precombustion-chamber forming portion forming a precombustion chamber including a small-diameter cylinder chamber and a large-diameter cylinder chamber, the small-diameter cylinder chamber communicating with the main combustion chamber via a plurality of nozzle holes and having a predetermined inner diameter, the large-diameter cylinder chamber having an inner diameter larger than that of the small-diameter cylinder chamber;
an ignition device disposed in the large-diameter cylinder chamber of the precombustion chamber; and
a precombustion-chamber-gas supply device including a precombustion-chamber-fuel-gas supply valve configured to supply a precombustion chamber fuel gas to the precombustion chamber not via the main combustion chamber,
wherein at least one nozzle hole of the plurality of nozzle holes is formed so that:
a precombustion-chamber-side straight line which is a straight line passing through a central position of a precombustion-chamber-side opening of the at least one nozzle hole and parallel to an extending direction of a central line of the precombustion-chamber-side opening of the at least one nozzle hole intersects with a main-chamber-side straight line which is a straight line passing through a central position of a main-chamber-side opening of the at least one nozzle hole and parallel to an extending direction of a central line of the main-chamber-side opening of the at least one nozzle hole; and an acute angle between a precombustion chamber central axis of the precombustion chamber and the precombustion-chamber-side straight line is smaller than an acute angle between the precombustion chamber central axis and the main-chamber-side straight line, wherein the precombustion-chamber forming portion is disposed on the main-chamber forming portion so that a main chamber central axis of the main combustion chamber coincides with the precombustion chamber central axis corresponding to both central axes of the small-diameter cylinder chamber and the large-diameter cylinder chamber, wherein the acute angle between the precombustion chamber central axis of the precombustion chamber and the precombustion-chamber-side straight line of all the nozzle holes are the same, wherein the acute angle between the precombustion chamber central axis and the main-chamber-side straight line of at least one of the nozzle holes is different from the acute angle between the precombustion chamber central axis and the main-chamber-side straight line of the other nozzle holes, wherein the at least one nozzle hole of the plurality of nozzle holes includes:

a precombustion-chamber-side linear hole portion of linear shape forming the precombustion-chamber-side opening at a first end of the precombustion-chamber-side linear hole portion; and a main-chamber-side linear hole portion of linear shape connected to a second end of the precombustion-chamber-side linear hole portion and forming the main-chamber-side opening, wherein the precombustion-chamber-side straight line coincides with a central line of the nozzle hole passing through the precombustion-chamber-side linear hole portion, and wherein the main-chamber-side straight line coincides with a central line of the nozzle hole passing through the main-chamber-side linear hold portion.

2. The precombustion chamber gas engine according to claim 1, wherein each of the plurality of nozzle holes is formed so that:

the precombustion-chamber-side straight line intersects with the main-chamber-side straight line; and the acute angle between the precombustion chamber central axis and the precombustion-chamber-side straight line is smaller than the acute angle between the precombustion chamber central axis and the main-chamber-side straight line, and wherein the plurality of nozzle holes are same in the acute angle between the precombustion chamber central axis and the precombustion-chamber-side straight line.

3. The precombustion chamber gas engine according to claim 1, wherein an acute angle between a central line of the precombustion chamber and the precombustion-chamber-side straight line is 0° or more and 65° or less.

4. The precombustion chamber gas engine according to claim 1, wherein an acute angle between a main chamber central axis of the main combustion chamber and the main-chamber-side straight line is 65° or more and 80° or less.

5. The precombustion chamber gas engine according to claim 1, wherein a length of the small-diameter cylinder chamber is longer than a length of the large-diameter cylinder chamber.

6. The precombustion chamber gas engine according to claim 1, wherein respective precombustion-chamber-side openings of the plurality of nozzle holes are formed in the small-diameter cylinder chamber at the same position in an extending direction of the precombustion chamber central axis.

* * * * *